United States Patent Office 3,164,524
Patented Jan. 5, 1965

3,164,524
ORAL ANTISEPTIC
Theodore I. Fand, Convent, Fred C. Ninger, Livingston, and Morris E. Stolar, Mount Freedom, N.J., assignors to Warner-Lambert Pharmaceutical Company, Morris Plains, N.J., a corporation of Delaware
No Drawing. Filed Feb. 27, 1961, Ser. No. 91,624
2 Claims. (Cl. 167—93)

The present invention relates to a new and novel oral antiseptic composition and relates more particularly to an oral antiseptic composition which retains desirable oral antiseptic activity even when diluted with one or more volumes of water.

Oral antiseptics have been in widespread use for many years for general oral hygiene since by their antibacterial activity they are able to control the number of bacteria present in the mouth and throat. An oral antiseptic which is widely used and has been for many years comprises an aqueous alcoholic solution of boric acid, benzoic acid, menthol, methyl salicylate, thymol and eucalyptol in combination with added coloring agents.

While this composition is quite effective as an antiseptic when measured by accepted test procedures, either at full strength or at a 1:1 dilution with water, it generally does not display the same effective antiseptic properties when diluted much further. In the case of those consumers who by habit dilute oral antiseptics with water, if the dilution is excessive the full benefits of the antiseptic are not obtained. In addition, any antiseptic which is used in the oral cavity becomes diluted by the moisture normally present in the mouth. In other situations a more highly concentrated oral antiseptic is frequently desired where weight is a factor and a concentrate will enable a small volume to provide the desired activity by suitable dilution. For these reasons improved antiseptics for oral use which are acceptable as concentrates and which still possess antiseptic properties on dilution with water would be highly desirable.

While the above factors are significant in considering the value and acceptability of any oral antiseptic an equally important factor is the duration of antibacterial activity and, preferably, this should be apparent for at least 10 to 12 hours after use. The use of such an antiseptic early in the day will, generally, insure a clean and healthy mouth throughout the greater part of the remaining hours of the day. Even though the oral antiseptic described above generally possesses activity within the mouth of up to 8 hours after use, obvious advantages are obtained with an oral antiseptic which remains effective for even greater periods of time after use.

It is an object of this invention to provide a new and improved oral antiseptic composition comprising a modified aqueous alcoholic solution of benzoic acid, boric acid, menthol, methyl salicylate, thymol and eucalyptol in which improved antiseptic properties are obtained either alone or on dilution with several volumes of water.

Another object of this invention is the provision of an improved oral antiseptic composition which is not only highly effective upon use but remains effective and retains activity within the mouth for 10 to 12 hours after use.

Other objects and the advantages of this invention will become apparent from the following detailed description.

It has now been found that the antiseptic properties of an antiseptic aquous alcoholic solution comprising benzoic acid, boric acid, menthol, methyl salicylate, thymol and eucalytol are substantially improved to yield an oral antiseptic of enhanced antiseptic properties by the incorporation in said composition of at least 0.15 milligram of 2,2'-thiobis-(4,6-dichlorophenol) per 100 milliliters of the composition. The improved oral antiseptic thus obtained not only possesses effective antiseptic properties upon dilution with two or even three volumes of water but also has been found to remain effective within the oral cavity for as long as 10 to 12 hours after use.

The aqueous alcoholic oral antiseptic compositions which are thus greatly enhanced by the addition of said 2,2'-thiobis-(4,6-dichlorophenol) are those, in accordance with this invention, which comprise generally an aqueous ethanol solution containing about 15 to about 30 percent by volume of ethanol and which also contain, in each 100 milliliters of the composition, about 5 to about 100 milligrams of benzoic acid, about 2 to about 3 grams of boric acid, about 5 to about 100 milligrams of methyl salicylate, about 50 to about 100 milligrams of thymol, about 20 to about 60 milligrams of menthol and about 5 to about 150 milligrams of eucalyptol. Typical of such oral antiseptics is that described in the Journal of the American Medical Association, volume 96, page 1304 (1931).

While the improved oral antiseptic of our invention will contain at least 0.15 milligrams of 2,2'-thiobis-(4,6-dichlorophenol) per 100 milliliters of the composition, a concentration of from 0.15 to 0.70 milligram per 100 milliliters is generally preferred.

The following example is given in order further to illustrate the compositions of our invention:

EXAMPLE

The following oral antiseptic compositions are prepared by adding the components listed below to an aqueous ethanol solution containing 25 percent of ethanol by volume, the components listed being present in the finished compositions in the amounts indicated:

| Composition | Concentration (mg./100 ml.) | | | | |
|---|---|---|---|---|---|
| | A | B | C | D | E |
| Components: | | | | | |
| Boric Acid | 2,350 | 2,350 | 2,350 | 2,350 | 2,350 |
| Benzoic Acid | 14 | 14 | 14 | 14 | 14 |
| Menthol | 43 | 43 | 43 | 43 | 43 |
| Methyl Salicylate | 55 | 55 | 55 | 55 | 55 |
| Thymol | 75 | 75 | 75 | 75 | 75 |
| Eucalyptol | 90 | 90 | 90 | 90 | 90 |
| 2,2'-thiobis-(4,6-dichlorophenol) | | 0.15 | 0.30 | 0.50 | 0.70 |

Composition A represents the known oral antiseptics of the prior art which have been referred to above while Compositions B, C, D and E represent the improved compositions of our invention and containing, as noted above, 0.15, 0.30, 0.50 and 0.70 milligram of 2,2'-thiobis-(4,6-dichlorophenol) per 100 milliliters of the composition.

The antiseptic effectiveness of said compositions is determined by an invitro test in which the ability of the composition to kill the organism S. aureus is evacuated.

In the recognized and accepted test procedure for determining the antiseptic effectiveness of antiseptic compositions, 5 ml. of the composition at 37.5° C. is mixed with 0.5 ml. of a standardized broth culture of S. aureus (Food and Drug Administration Strain No. 209) and the mixture is maintained at 37.5° C. A loopful of this mixture is then transferred to each of separate portions of sterile broth at varying time intervals between 30 seconds and 10 minutes after the initial mixing of the composition with the broth culture of S. aureus. The separately inoculated portions of broth are incubated at 37.5° C. for 48 hours and are then observed for any signs of growth of the organism. If growth is observed in any inoculated portion, the composition tested is not considered to be antiseptic for bacteria in general when they are exposed to the test composition for the time interval corresponding to that equal to that which elapsed before the transfer to stirile broth as described above. If no growth is observed, the composition is considered to be antiseptic by the test.

The broth used in preparing the standard culture and for incubation of the test samples is prepared by mixing 5 grams of beef extract, 5 grams of sodium chloride, and 10 grams of peptone in 1000 ml. of distilled water, boiling the mixture for 20 minutes, cooling, adjusting the volume to 1000 ml., adjusting the pH to 6.8 with sodium hydroxide, filtering and sterilizing.

The culture of *S. aureus* 209 used in the test is standarized so as to be resistant to the action of a solution of 1 part phenol in 80 parts of water for 5 minutes and resistant to a solution of 1 part phenol in 90 parts of water for 15 minutes.

The following table presents the antiseptic properties of compositions A, B, C, D and E as evaluated in the above described test, both at full strength and at successive dilutions with distilled water. The table given lists the time after mixing each composition (or aqueous dilution) with the standardized broth culture at which complete kill occurs (as determined by an observation of no growth after 48 hours incubation of broth inoculated with a loopful of the mixture). Where a range of times is given, the smaller number represents the longest observed time for incomplete kill and the larger, the shortest observed time for complete kill, indicating that complete kill occurs at some time within the given range.

*Table I*

TIME IN MINUTES FOR COMPLETE KILL

| Composition | Full Strength | Dilutions with equal volumes of distilled water [1] | | |
|---|---|---|---|---|
| | | 1+1 | 1+2 | 1+3 |
| A | <0.5 | 0.5-1.0 | >10 | >10 |
| B | <0.5 | <0.5 | 1.5-2.0 | 5.0-7.5 |
| C | <0.5 | <0.5 | 0.5-1.0 | 3.5-5.0 |
| D | <0.5 | <0.5 | 3.0-3.5 | 3.5-5.0 |
| E | <0.5 | <0.5 | 0.5-1.0 | 3.5-5.0 |

[1] Expressed as 1 part of the composition at full strength plus 1, 2 or 3 parts by volume of distilled water.

The results presented in Table I show that Compositions B, C, D and E of our invention exhibit a more rapid kill than the control composition A at 1+1, 1+2 and 1+3 dilutions with water. Furthermore, since a kill in 5 minutes or less in this test is generally recognized as qualifying the composition in question to be called "antiseptic," it is apparent that compositions B, C, D and E are "antiseptic" at 1+2 dilutions and Compositions C, D and E are antiseptic at 1+3 dilutions, whereas the control composition A is antiseptic at only a 1+1 dilution.

The greatly improved antiseptic properties of the compositions of our invention are the result of a truly unexpected synergistic action, as established by the following data:

The following compositions are prepared, consisting of varying amounts of 2,2'-thiobis-(4,6-dichlorophenol) in aqueous ethanol containing 25 percent ethanol by volume. Each composition is then tested at full strength by the above described test procedure.

*Table II*

| Composition | Concentration of 2,2'-thiobis-(4,6-dichlorophenol), mg./100 ml. | Time for Comp'ete Kill (minutes) |
|---|---|---|
| F | 0.15 | >10 |
| G | 0.30 | >10 |
| H | 0.50 | >10 |
| I | 0.70 | >10 |

The data presented in Table II clearly show that 2,2'-thiobis-(4,6-dichlorophenol) in 25 percent aqueous ethanol ethanol at the concentrations present in compositions B, C, D and E does not exhibit complete kill of the test organism even after exposure for a 10 minute test period while the incorporation of this compound at these low concentrations into the prior art antiseptic (Composition A) results in the production of antiseptic compositions of markedly superior properties.

The duration of effectiveness of any oral antiseptic within the oral cavity is readily determined by means of a buccal epithelial sensitivity test, using the procedure of Vinson and Bennett, J. Amer. Pharm. Assoc., 47, 635 (1958). This test measures the ability of scrapings taken from the oral cavity at varying time intervals after rinse with an oral antiseptic to inhibit the growth of a test organism on a seeded agar plate.

In the test, a number of healthy subjects not under the care of a dentist rinse the oral cavity for 30 seconds with a 15 ml. sample of the oral antiseptic under test. Buccal samples for analysis are then taken by gently scraping the inside of each cheek with a curette immediately after rinse and at two hour intervals thereafter.

Scrapings from each subject at each time interval are transferred to the center of two sterile 7 mm. filter paper discs which are then inverted onto plates containing nutrient agar inoculated with 0.5 percent of a 24 hour culture *S. aureus* (Strain 209). The plates are incubated overnight at 37° C. and then examined microscopically. The total number of colonies per microscope field is recorded and compared with the colony count of an adjacent area of the plate not in contact with the filter paper discs which serves as a control.

The results are recorded as the percent reduction in colony count for the area covered by the paper disc compared to the count in the control area.

Results of buccal epithelial sensitivity tests by the foregoing procedure as applied to Compositions A, C and D are as follows:

*Table III*

| Times After Rinse (hours) | Percent Reduction in Colony Count | | |
|---|---|---|---|
| | Comp. A | Comp. C | Comp. D |
| 0 | 56 | 42 | 55 |
| 2 | 46 | 35 | 51 |
| 4 | 32 | 30 | 48 |
| 6 | 19 | 25 | 44 |
| 8 | 3 | 21 | 41 |
| 10 | | 13 | 37 |
| 12 | | 3 | 21 |

These data reveal that Compositions C and D of this invention remain noticeably effective for 12 hours after rinse whereas Composition A of the prior art loses effectiveness after 8 hours.

It is understood that the foregoing detailed description is given merely by way of illustration and that many variations may be made therein without departing from the spirit of our invention.

Having described our invention, what we desire to secure by Letters Patent is:

1. An improved oral antiseptic preparation comprising an aqueous solution of ethanol containing 20 to 30 percent ethanol by volume and for each 100 milliliters of said preparation about 10 to about 100 milligrams of benzoic acid, about 2 to about 3 grams of boric acid, about 10 to about 100 milligrams of methyl salicylate, about 50 to about 100 milligrams of thymol, about 20 to about 60 milligrams of menthol and about 5 to about 150 milligrams of eucalyptol, and containing at least 0.15 milligram of 2,2'-thiobis-(4,6-dichlorophenol) in each 100 milliliters of said preparation.

2. An oral antiseptic according to claim 1 which contains 0.15 to 0.70 milligram of 2,2'-thiobis-(4,6-dichlorophenol) per 100 milliliters.

References Cited in the file of this patent

UNITED STATES PATENTS 2,961,375  Shaw _____ Nov. 22, 1960

OTHER REFERENCES

Journal of the Amer. Med. Assoc., April 18, 1931, page 1304.

Ostrolenk: Journal of the Amer. Pharmaceutical Assoc., Scientific edition, April 1953, pp. 200–206.

Jacobs: Amer. Perfumer and Essential Oil Review, June 1953, pp. 469 and 471.

Hunter: Amer. Perfumer and Essential Oil Review, February 1953, pp. 122–127.

Vinson: Journal of the Amer. Pharmaceutical Assoc., Scientific edition, September 1958, pp. 635–639.

Chem. Abst. vol. 54, 1960, page 14592C.